(12) United States Patent
Ma et al.

(10) Patent No.: US 12,111,163 B2
(45) Date of Patent: *Oct. 8, 2024

(54) AUTOMATICALLY PLANNING DELIVERY ROUTE

(71) Applicant: Walmart Apollo, LLC, Bentonville, AR (US)

(72) Inventors: Chenxin Ma, Belmont, CA (US); Mingang Fu, Palo Alto, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/102,828

(22) Filed: Jan. 30, 2023

(65) Prior Publication Data
US 2023/0175846 A1 Jun. 8, 2023

Related U.S. Application Data

(63) Continuation of application No. 16/777,966, filed on Jan. 31, 2020, now Pat. No. 11,624,622.

(51) Int. Cl.
*G01C 21/34* (2006.01)
*G06Q 10/047* (2023.01)
(Continued)

(52) U.S. Cl.
CPC ..... *G01C 21/3415* (2013.01); *G01C 21/3492* (2013.01); *G06Q 10/047* (2013.01); *G06Q 10/08355* (2013.01); *G06Q 50/40* (2024.01)

(58) Field of Classification Search
CPC ............ G01C 21/3415; G01C 21/3492; G06Q 10/047; G06Q 10/08355; G06Q 50/30
See application file for complete search history.

(56) References Cited

U.S. PATENT DOCUMENTS 6,185,724 B1  2/2001  Ochotta
7,363,126 B1  4/2008  Zhong et al.
(Continued)

OTHER PUBLICATIONS

Koizumi, Hisao, et al. "A delivery scheduling system by the distributed cooperative multiple agents." Proceedings 1997 International Conference on Parallel and Distributed Systems. IEEE, 1997. (Year: 1997) 1977.

*Primary Examiner* — Russell Frejd
*Assistant Examiner* — Ana D Thomas
(74) *Attorney, Agent, or Firm* — BRYAN CAVE LEIGHTON PAISNER LLP

(57) ABSTRACT

A method including setting a preferred delivery route as an initial delivery route comprising original delivery stops. The method further can include evaluating, in real-time, the preferred delivery route, comprising: (a) determining a to-be-resequenced delivery stop list by moving a random quantity of delivery stops from the original delivery stops to the to-be-resequenced delivery stop list based on a delivery-stop-selecting act, wherein: after the to-be-resequenced delivery stop list is determined, a modified preferred delivery route comprises remaining delivery stops from the original delivery stops; (b) after determining the to-be-resequenced delivery stop list, creating, in real-time, a resequenced delivery route by adding each delivery stop of the random quantity of delivery stops of the to-be-resequenced delivery stop list to the modified preferred delivery route; (c) determining, in real-time, whether the resequenced delivery route is preferred over the preferred delivery route; and (d) when the resequenced delivery route is determined to be preferred over the preferred delivery route, resetting, in real-time, the preferred delivery route to be the resequenced delivery route. The method further can include transmitting, in real-time via a computer network, the preferred delivery route to a driver mobile device of a delivery driver for the (Continued)

delivery driver to follow the preferred delivery route to make deliveries. Other embodiments are disclosed.

22 Claims, 7 Drawing Sheets

(51) Int. Cl.
  *G06Q 10/0835* (2023.01)
  *G06Q 50/40* (2024.01)

(56) References Cited

U.S. PATENT DOCUMENTS

| | | |
|---|---|---|
| 10,107,635 B2 | 10/2018 | Larner |
| 2008/0140597 A1 | 6/2008 | Satir et al. |
| 2008/0147473 A1 | 6/2008 | Zhong |
| 2010/0057652 A1 | 3/2010 | Seshan |
| 2017/0262790 A1 | 9/2017 | Khasis |
| 2018/0204229 A1 | 7/2018 | Bateman |
| 2018/0240066 A1 | 8/2018 | Streebin et al. |
| 2020/0033151 A1* | 1/2020 | Seshadri ................ G01C 21/20 |
| 2020/0082323 A1* | 3/2020 | Heise ................ G06Q 10/047 |
| 2020/0292346 A1* | 9/2020 | Turner ................ G01C 21/343 |
| 2021/0041241 A1* | 2/2021 | Mitra ................ B64C 39/024 |
| 2022/0027838 A1* | 1/2022 | Kataoka ................ H02J 7/0048 |
| 2022/0036310 A1* | 2/2022 | Heinla ................ G06Q 10/08 |

* cited by examiner

400

| 410 Extracting an initial delivery route from the delivery data. |

| 420 Setting a preferred delivery route as the initial delivery route. |

| 430 Evaluating, in real-time, the preferred delivery route. |
|---|
| 431 Resequencing the delivery stops of the preferred delivery route into a resequenced delivery route. |
|  |
| 432 Determining, in real-time, whether the resequenced delivery route is preferred over the preferred delivery route |
|  |
| 433 When the resequenced delivery route is preferred, then resetting, in real-time, the preferred delivery route to be the resequenced delivery route; otherwise, maintaining, in real-time, the preferred delivery route. |

| 440 Repeating evaluating, in real-time, the preferred delivery route until a predetermined stop condition occurs. |

| 450 Transmitting, in real-time via a network, the preferred delivery route to a driver mobile device of a delivery driver for the delivery driver to follow the preferred delivery route to make deliveries. |

FIG. 4

500: Exemplary Program for Batched Neighborhood Search
Input: A set of routes, iteration Limit $T$
For Each route $R$
    Set iteration counter to be 0
    Compute temperature based on the route load
    Compute the current cost $c0$
    Choose a random *batchSize* from the range $0.1*N$ to $0.4*N$
    Clear removed list $L$
    For $i = 0$ to *batchSize*
        Set $N$ to be the number of orders in $R$
        Get a random number $C$ in range $[0,1]$
        If $C > N/2(N+1)$ and $i > 0$
            Choose $A$ to be the order next to $A$ in previous iteration
        Else
            If $N$ is greater than 50
                Randomly choose an order $A$ in $R$
            Else
                Set minimal cost saving to be infinity
                For each order $B$ in $R$
                      Compute cost saving if removing $A$
                      If cost saving is less than minimal cost saving
                          Set $A=B$
                      EndIf
                EndFor
            EndIf
        EndIf
        Remove order $A$ from $R$
        If not success
            Go back to the beginning of the loop
        Else
            Add $A$ to the removed list $L$
        EndIf
    EndFor
    If the size of removed list $L$ is greater than threshold
        For each order $B$ in $L$
            Insert $B$ into $R$ by greedy algorithm
            Remove $B$ from $L$
        EndFor
    Else
        While $L$ is not empty
            Randomly choose an order $B1$ from $L$
            For each order $B2$ in $L$
                If the best additional cost of $B2$ is lower than $B1$
                    Set $B1 = B2$
                EndIf
            EndFor
            Insert $B1$ into $R$ by greedy algorithm
        EndWhile
    EndIf
    Compute the new cost $c1$
    If $c1 < c0$
        Generate a random number
        If random number is great than *temperature/(temperature+0.5)*
            Recover $R$ to the initial state
        EndIf
    EndIf
EndFor

FIG. 5

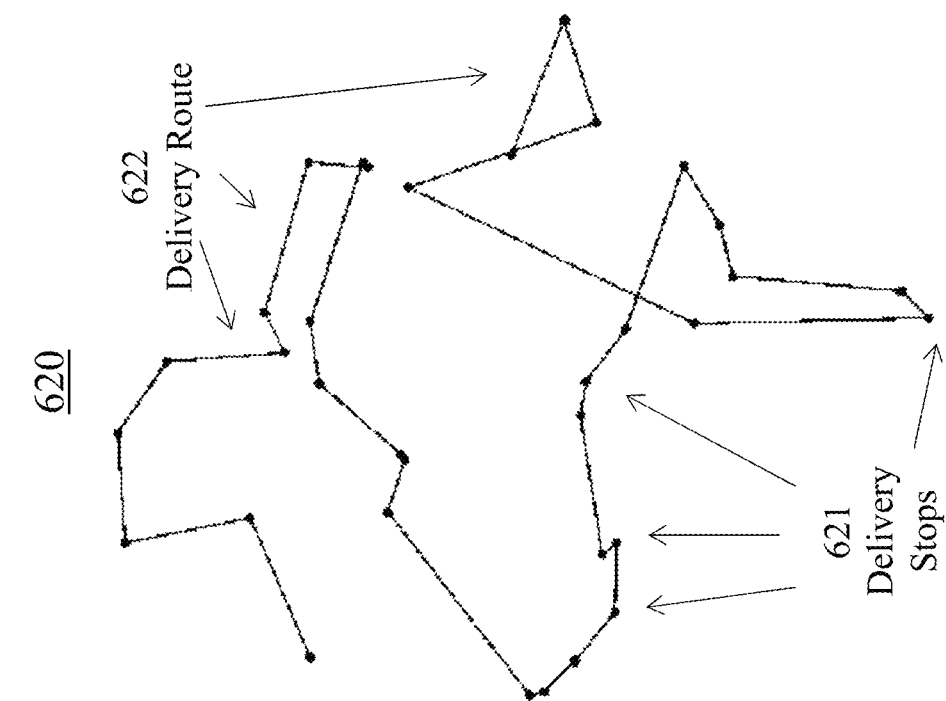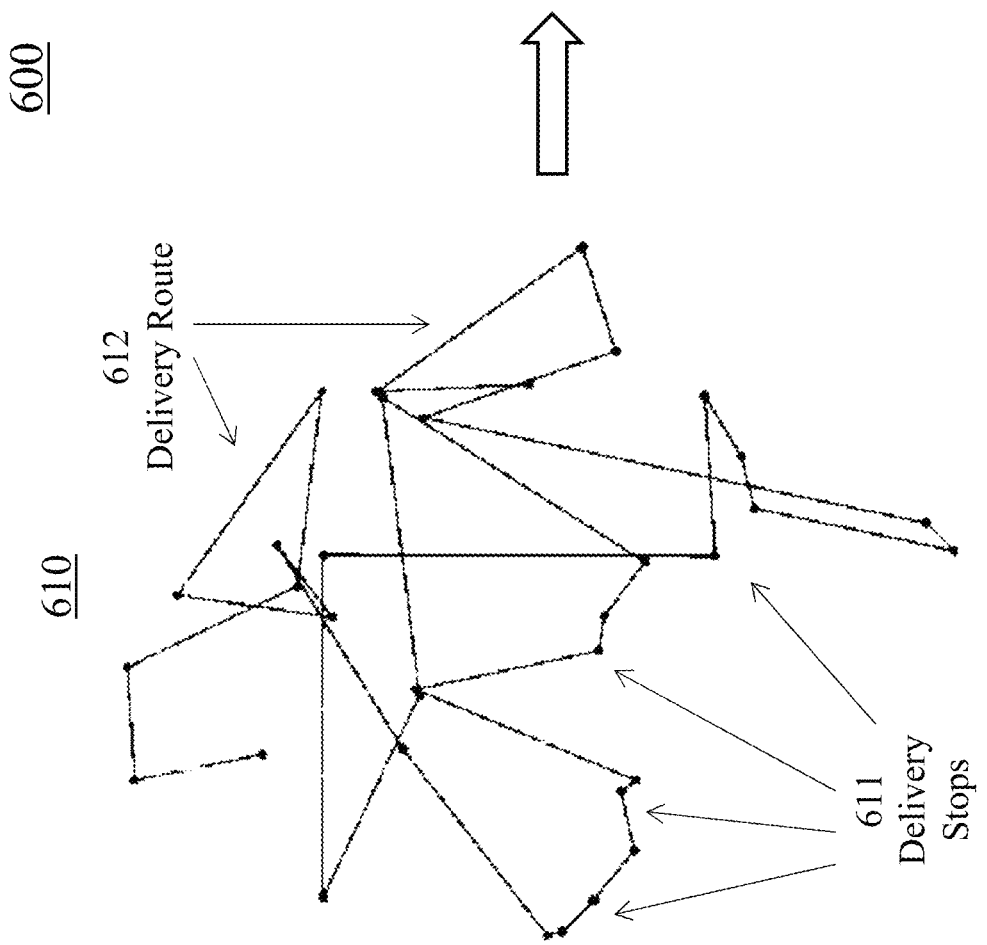
FIG. 6

AUTOMATICALLY PLANNING DELIVERY ROUTE

CROSS-REFERENCE TO RELATED APPLICATIONS

This application is a continuation of U.S. patent application Ser. No. 16/777,966, filed Jan. 31, 2020. U.S. patent application Ser. No. 16/777,966 is incorporated herein by reference in its entirety.

TECHNICAL FIELD

This disclosure relates generally to automatically planning delivery routes.

BACKGROUND

Delivery route planning of hundreds or thousands of orders can be a time consuming task. Conventional systems, such as simulated annealing, generally simulate by switching a pair of delivery stops in each iteration and, consequently, can be slow. Systems and methods for automatically planning a delivery route that can switch multiple pairs in order to reduce the number of iterations are desired.

BRIEF DESCRIPTION OF THE DRAWINGS

To facilitate further description of the embodiments, the following drawings are provided in which:

FIG. 4 illustrates a flow chart for a method of optimizing a delivery route, according to an embodiment;

FIG. 5 illustrates an exemplary program to be executed for a method of optimizing a delivery route, according to an embodiment;

FIG. 6 illustrates an exemplary application for a method of optimizing a deliver route, according to the embodiment of FIG. 5.

Figure 1:
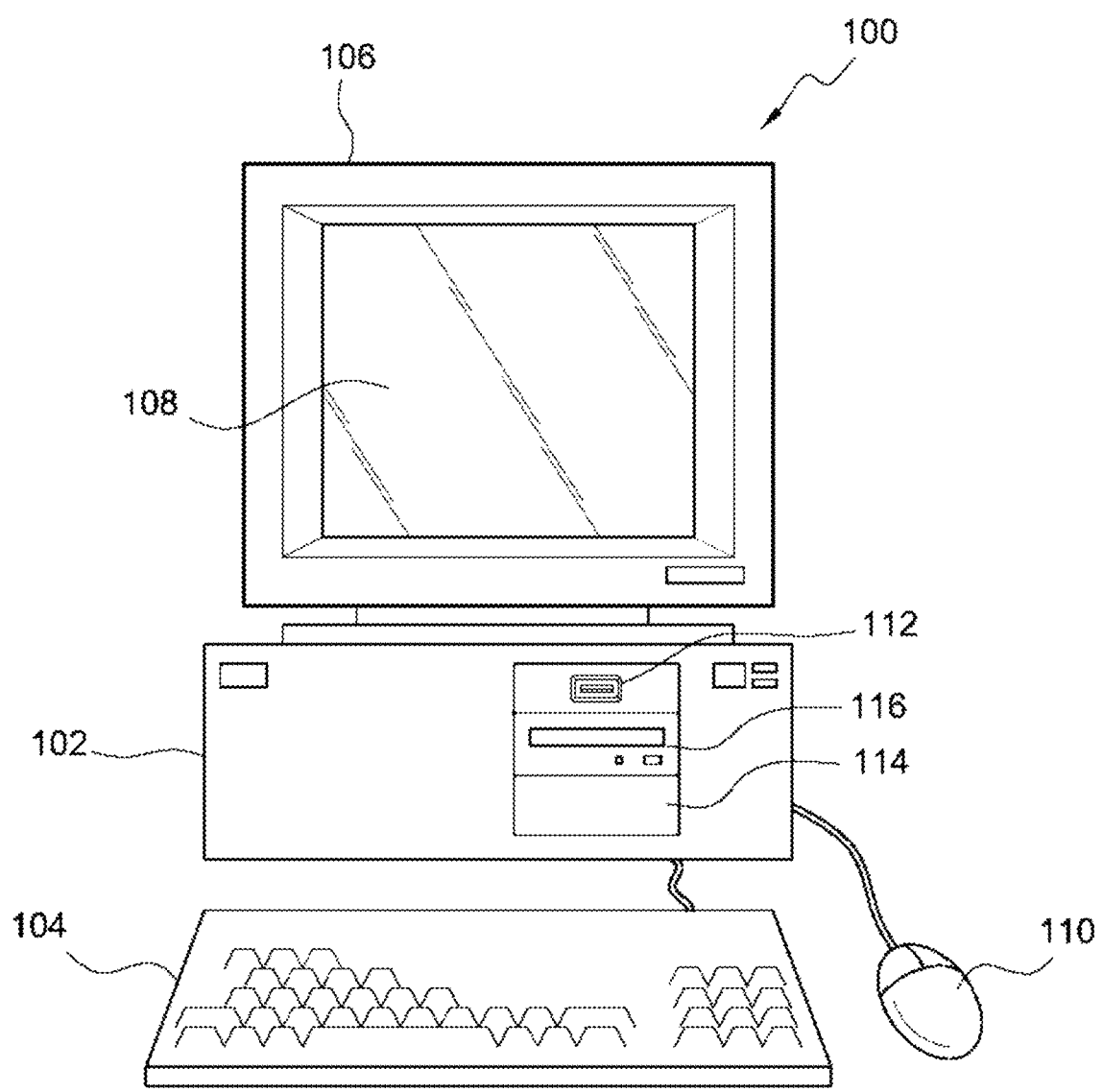
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

Figure 2:
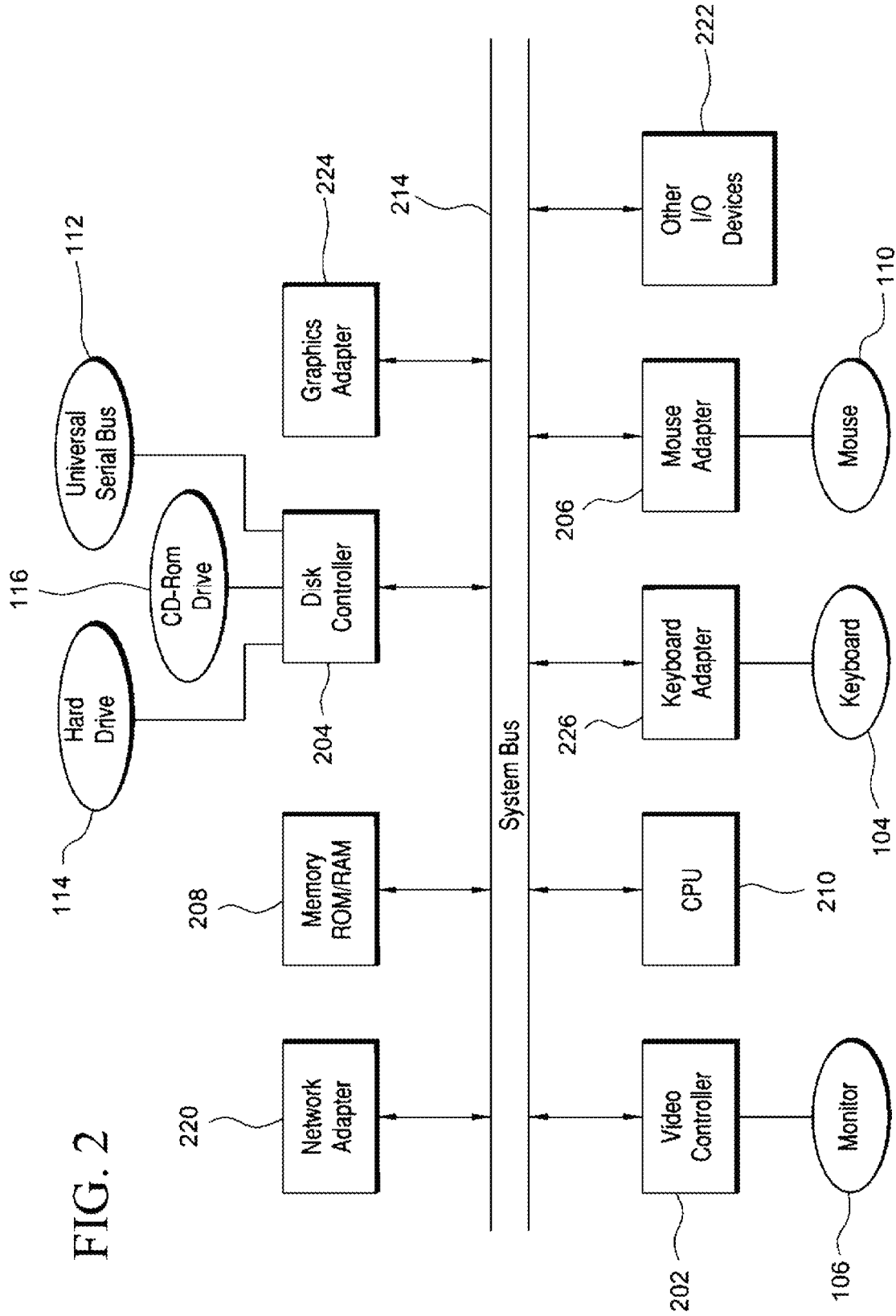
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
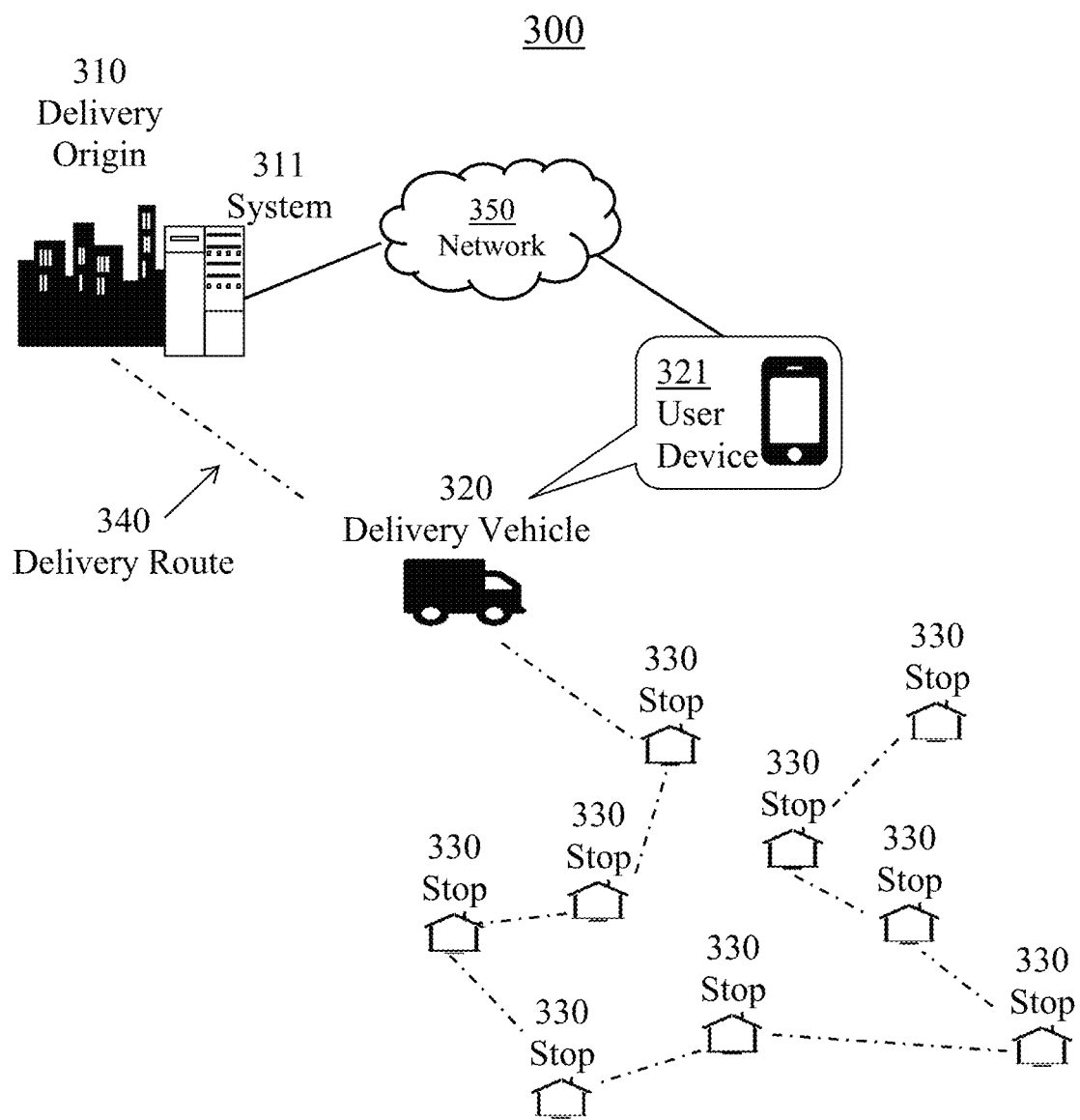
FIG. 3 illustrates a block diagram of a system of optimizing a delivery route, according to an embodiment.

Turning ahead in the drawings, FIG. 3 illustrates a block diagram of a system 300 of optimizing a delivery route, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., system 311) and one or more user devices (e.g., user device 321). System 311 and user device 321 can each be a computer system, such as computer system 100 (FIG. 1), as described above, and can each be a single computer, a single server, or a cluster or collection of computers or servers, or a cloud of computers or servers. In another embodiment, a single computer system can host each of system 311 and/or user device 321. In many embodiments, system 311 can be modules of computing instructions (e.g., software modules) stored at non-transitory computer readable media that operate on one or more processors. In other embodiments, system 311 can be implemented in hardware. In many embodiments, system 311 can comprise one or more systems, subsystems, modules, or servers. Additional details regarding system 311 and/or user device 321 are described herein.

In some embodiments, system 311 can be in data communication, through a computer network, a telephone network, or the Internet (e.g., network 350), with user device 321. In some embodiments, user devices 321 can be used by users, such as delivery drivers (not shown) of delivery vehicle 320. In a number of embodiments, system 311 can host one or more websites and/or mobile application servers. For example, system 311 can host a website, or provide a server that interfaces with an application (e.g., a mobile application or a web browser), on user device 321, which can allow users 330 to request, receive, and/or follow the delivery route (e.g., delivery route 340) to make deliveries, in addition to other suitable activities. In some embodiments, an internal network (e.g., network 350) that is not open to the public can be used for communications between system 311 and user device 321 within system 300.

In certain embodiments, the user devices (e.g., user device 321) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 311 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 311 in a wired manner and/or a wireless manner, and the coupling can be direct and/or indirect, as well as locally and/or remotely. As an example of an indirect manner (which may or may not also be a remote manner), a keyboard-video-mouse (KVM)

switch can be used to couple the input device(s) and the display device(s) to the processor(s) and/or the memory storage unit(s). In some embodiments, the KVM switch also can be part of system 311. In a similar manner, the processors and/or the non-transitory computer-readable media can be local and/or remote to each other.

Meanwhile, in many embodiments, system 311 also can be configured to communicate with one or more databases. The one or more databases can include a delivery database that contains information regarding delivery stops, for example, among other information, as described below in further detail. The one or more databases further can include a user profile database that contains user profiles of users 330, including information such as account data, The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 311, and/or the one or more databases can be implemented using any suitable manner of wired and/or wireless communication. Accordingly, system 300 and/or system 311 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 311 can extract an initial delivery route (e.g., delivery route 340) from the delivery data. System 311 can extract the initial delivery route by determine the initial delivery route using one or more of suitable algorithms, such as a greedy algorithm, a multi-fragment algorithm, a nearest addition algorithm, Christofides' algorithm, and so forth. The initial delivery route can comprise delivery stops (e.g., stop 330) in the delivery route. System 311 further can initialize a preferred delivery route by setting the preferred delivery route as the initial delivery route. System 311 also can evaluate, in real-time, the preferred delivery route. In many embodiments, system 311 can repeat the real-time evaluation of the preferred delivery route until a predetermined stop condition occurs. The predetermined stop condition can include one or more of: a time limit; a maximum count of repetitions of the evaluation; whether there is any improvement between 2 or 3, for example, consecutive evaluations; etc. In some embodiments, after repeating the real-time evaluation of the preferred delivery route, system 311 further can transmit, in real-time via a network, the preferred delivery route to a driver mobile device (e.g., user device 321) of a delivery driver for the delivery driver to follow the preferred delivery route to make deliveries.

In many embodiments, to evaluate the preferred delivery route, system 311 can determine a to-be-resequenced delivery stop list based on the preferred delivery route. The to-be-resequenced delivery stop list can include a random quantity of delivery stops (e.g., stop 330). In some embodiments, the random quantity (x) can be limited to a range, such as $5<x<20$ or $10\%*N \leq x \leq 40\%*N$, where N is the total number of delivery stops. Each delivery stop of the random quantity of delivery stops of the to-be-resequenced delivery stop list can be moved from the preferred delivery route to the to-be-resequenced delivery stop list to create a modified preferred delivery route. The modified preferred delivery route can contain remaining delivery stops from the preferred delivery route that are not in the random quantity of delivery stops.

The each delivery stop of the preferred delivery route can be selected to be moved to the to-be-resequenced delivery stop list by using a selecting act of multiple delivery-stop-selecting acts, such as random selection, selection based on cost (e.g., a distance decrease when a delivery stop is removed from the preferred delivery route), and so forth. The selecting act can be determined based, at least in part, on a random number. At any point in time during the evaluating the preferred delivery route, the delivery stops of the preferred delivery route can comprise the remaining delivery stops of the modified preferred delivery route and the delivery stops of the random quantity of delivery stops of the to-be-resequenced delivery stop list.

After determining the to-be-resequenced delivery stop list, system 311 also can create, in real-time, a resequenced delivery route by adding each delivery stop of the random quantity of delivery stops of the to-be-resequenced delivery stop list to the modified preferred delivery route to create the resequenced delivery route. All of the delivery stops of the preferred delivery route can be in the resequenced delivery route. A sequence of the delivery stops of the preferred delivery route can be different from a sequence of the delivery stops of the resequenced delivery route.

In many embodiments, system 311 can determine, in real-time, whether the resequenced delivery route is preferred over the preferred delivery route. In some embodiments, which delivery route is preferred can be determined based on one or more of: the respective total distance, the respective traffic time, or a random choice, etc. When the resequenced delivery route is determined to be preferred over the preferred delivery route, system 311 can reset, in real-time, the preferred delivery route to be the resequenced delivery route. When the resequenced delivery route is determined to not be preferred over the delivery route, system 311 can maintain, in real-time, the preferred delivery route.

In many embodiments, for each repetition of the evaluation, the random quantity of delivery stops, the random number for determining the selecting act of multiple delivery-stop-selecting acts, and/or the selecting act determined can be different.

Referring to FIG. 3, a delivery network for system 300 can include a delivery origin 310 (e.g., a warehouse, a distribution center, or a mortar and brick store), a delivery vehicle 320, delivery stops 330 (e.g., delivery destinations for online orders), and a delivery route 340 for the delivery vehicle 320 to stop at each of the delivery stops 330 at least once. In some embodiments, delivery origin 310 is only a single delivery origin.

Turning ahead in the drawings, FIG. 4 illustrates a flow chart for a method of optimizing a delivery route, according to an embodiment. In some embodiments, method 400 can be a method of automatically determining delivery routes, including grouping geographically close nodes into clusters. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) and/or system 311 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3) and/or system 311 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of extracting an initial delivery route from the delivery data. Block 410 can include determining the initial delivery route and/or receiving the initial delivery route as an input from another system, module, and/or subsystem. In many embodiments, the initial delivery route can comprise delivery stops (e.g., stops 330 (FIG. 3)).

Method 400 further can include a block 420 of setting a preferred delivery route as the initial delivery route.

Method 400 also can include a block 430 of evaluating, in real-time, the preferred delivery route. In many embodiments, block 430 further can include an optional block 431 of determining a to-be-resequenced delivery stop list based on the preferred delivery route. In some embodiments, method 400 can include generating the random quantity within a range defined by a function of a total quantity of the delivery stops of the preferred delivery route, in block 431 or a new block prior to block 431. For example, the range can be from 10 to 50, from 10% to 40% of the total quantity of the delivery stops of the preferred delivery route, or up to 100% when the total number of delivery stops of the preferred delivery route is less than a predetermined minimum threshold (e.g., 5 or 10), etc. In certain embodiments, method 400 can skip the step/act of generating the random quantity and can let the to-be-resequenced delivery stop list comprise all the delivery stops of the preferred delivery route when a total delivery stop count is less than 5, 10, or 20, etc.

Moreover, each delivery stop of the random quantity of delivery stops of the to-be-resequenced delivery stop list can be moved from the preferred delivery route to the to-be-resequenced delivery stop list to create a modified preferred delivery route containing remaining delivery stops from the preferred delivery route that are not in the random quantity of delivery stops. As an example, when the total number of delivery stops in the preferred delivery route is 80 and the random quantity of delivery stops for the to-be-resequenced delivery stop list is 25, the modified preferred delivery route can include the remaining 55 delivery stops.

In many embodiments, after the size of the to-be-resequenced delivery stop list is determined, block 431 can determine how to select the random quantity of delivery stops of the to-be-resequenced delivery stop list from the delivery stops of the preferred delivery route. In some embodiments, block 431 can select each of the random quantity of delivery stops of the to-be-resequenced delivery stop list by using a selecting act of multiple delivery-stop-selecting acts.

In a number of embodiments, the multiple delivery-stop-selecting acts for selecting the delivery stops from the to-be-resequenced delivery stop list can include two or more of: (a) randomly picking a particular one of the delivery stops to be removed from the preferred delivery route; (b) determining the particular one of the delivery stops to be removed from the preferred delivery route based on a cost for the delivery stop; or (c) choosing the particular one of the delivery stops to be removed from the preferred delivery route based, at least in part, on a position of a previously resequenced delivery stop in a prior version of the preferred delivery route; etc. In many embodiments, the selecting act can be determined based, at least in part, on a random number. The random number for of the random quantity of delivery stops of the to-be-resequenced delivery stop list can be different. Block 431 also can use a different respective selecting act for each of the random quantity of delivery stops of the to-be-resequenced delivery stop list.

In some embodiments, block 431 can include generating the random number within a predefined range, such as 0-1. Block 431 also can include moving each delivery stop of the random quantity of delivery stops of the to-be-resequenced delivery stop list from the preferred delivery route to the to-be-resequenced delivery stop list to create the modified preferred delivery route based, at least in part, on the following.

First, when (a) the random number is greater than a random number threshold defined by a function of a quantity (N) of the delivery stops in the delivery stop information, such as N/(N+1); and (b) a prior version of the preferred delivery route exists, block 431 can include choosing a delivery stop from the preferred delivery route based on a position of a previously preferred delivery stop in the prior version of the preferred delivery route. For instance, if a prior version of the preferred delivery route exists, and block 431 chooses the i-th delivery stop of the prior version of the preferred delivery route as the j-th delivery stop of the random quantity of delivery stops of the to-be-resequenced delivery stop list, block 431 can choose the (i+1)-th delivery stop of the preferred delivery route as the (j+1)-th delivery stop of the random quantity of delivery stops of the to-be-resequenced delivery stop list.

Second, when (a) (i) the random number is not greater than the random number threshold, or (ii) no prior version of the preferred delivery route exists; and (b) the random quantity of delivery stops is greater than a predefined delivery stop count threshold, block 431 can include randomly picking a delivery stop from the resequenced delivery route.

Third, when (a) (i) the random number is not greater than the random number threshold, or (ii) no prior version of the preferred delivery route exists; and (b) the random quantity of delivery stops is not greater than the predefined delivery stop count threshold, block 431 can include: (A) determining a respective cost saving for removing each delivery stop of the remaining delivery stops of the modified preferred delivery route; (B) determining a most-cost-saving delivery stop of the remaining delivery stops of the modified preferred delivery route based on the respective cost savings; and (C) selecting the most-cost-saving delivery stop from the modified preferred delivery route.

Further, at any point in time during the evaluating the preferred delivery route, the delivery stops of the preferred delivery route can comprise the remaining delivery stops of the modified preferred delivery route and the delivery stops of the random quantity of delivery stops of the to-be-resequenced delivery stop list.

Method 400 (and in particular, block 430) also can include an optional block 432 of creating, in real-time, a resequenced delivery route by adding each delivery stop of the random quantity of delivery stops of the to-be-resequenced delivery stop list to the modified preferred delivery route to create the resequenced delivery route, after determining the to-be-resequenced delivery stop list at block 431. In some embodiments, all of the delivery stops of the preferred delivery route can be included in the resequenced delivery route. In many embodiments, a sequence of the delivery stops of the preferred delivery route can be different from a sequence of the delivery stops of the resequenced delivery route.

In some embodiments, block 432 can include, after adding each delivery stop of the random quantity of delivery stops of the to-be-resequenced delivery stop list to the modified preferred delivery route to create the resequenced delivery route, sorting, in real-time, the remaining delivery stops of the modified preferred delivery routes. In some embodiments, block 432 can sort the remaining stops every time a delivery stop is added to the modified preferred delivery routes. In several embodiments, block 432 can sort the remaining stops after all of the random quantity of delivery stops of the to-be-resequenced delivery stop list is added to the modified preferred delivery route. In a few embodiments, block 432 can include using a greedy algorithm on the resequenced delivery route.

In many embodiments, block 432 further can include, when the random quantity is greater than a predetermined quantity threshold, after adding each delivery stop of the random quantity of delivery stops from the to-be-resequenced delivery stop list to the modified preferred delivery route to create the resequenced delivery route, sorting, in real-time, the remaining delivery stops of the modified preferred delivery routes. In some embodiments, sorting the remaining delivery stops of the modified preferred delivery route can comprise using a greedy algorithm on the modified preferred delivery route.

Block 432 also can include, when the random quantity is not greater than the predetermined quantity threshold: (a) determining a respective cost addition for adding each delivery stop of the random quantity of delivery stops from the to-be-resequenced delivery stop list to the modified preferred delivery route to create the resequenced delivery route; (b) determining a lowest-cost-addition delivery stop of the random quantity of delivery stops from the to-be-resequenced delivery stop list based on the respective cost additions; (c) moving the lowest-cost-addition delivery stop from the to-be-resequenced delivery stop list to the modified preferred delivery route to create the resequenced delivery route; and (d) after moving the lowest-cost-addition delivery stop from the to-be-resequenced delivery stop list, sorting, in real-time, the remaining delivery stops of the modified preferred delivery routes.

Method 400 (and in particular, block 430) further can include an optional block 433 of determining, in real-time, whether the resequenced delivery route is preferred over the preferred delivery route. In many embodiments, block 433 can include at least one of: (a) when a route cost of the resequenced delivery route is less than a route cost of the preferred delivery route, determining that the resequenced delivery route is preferred over the preferred delivery route; or (b) when a random number generated in a predefined range is greater than a threshold defined by a function of a variable associated with a total quantity of the delivery stops of the preferred delivery route, determining that the resequenced delivery route is preferred over the preferred delivery route.

Method 400 additionally can include, when the resequenced delivery route is determined at block 433 to be preferred over the preferred delivery route, then resetting, in real-time, the preferred delivery route to be the resequenced delivery route; otherwise, maintaining, in real-time, the preferred delivery route.

Furthermore, method 400 can include a block 440 of repeating evaluating, in real-time, the preferred delivery route until a predetermined stop condition, such as a time limit (e.g., 10 seconds or 1 minute), a predetermined iteration count (e.g., repeating up to 100 times), or when the consecutive versions of preferred delivery routes are substantially the same, etc. occurs. Block 440 can determine that the consecutive versions of preferred delivery routes are substantially the same when the respective sequences of delivery stops of the consecutive versions of preferred delivery routes are identical, or when there is less than 10% difference in the respective sequences of delivery stops while the costs for the consecutive versions of preferred delivery routes are the same.

Method 400 also can include a block 450 of transmitting, in real-time via a network, the preferred delivery route to a user interface of a driver mobile device of a delivery driver so that the delivery driver can follow the preferred delivery route to make deliveries in an efficient manner.

Turning ahead in the drawings, FIG. 5 illustrates an exemplary program 500 to be executed for a method of optimizing a delivery route, according to an embodiment. In many embodiments, exemplary program 500 can comprise methods for repeating resequencing delivery stops in a delivery route and evaluating the resequenced delivery route until the stop condition is met or no further improvement is likely. Exemplary program 500 is merely exemplary and is not limited to the embodiments presented herein. Exemplary program 500 can be employed in many different embodiments or examples not specifically depicted or described herein. In some embodiments, the procedures, the processes, and/or the activities of exemplary program 500 can be performed in the order presented. In other embodiments, the procedures, the processes, and/or the activities of exemplary program 500 can be performed in any suitable order. In still other embodiments, one or more of the procedures, the processes, and/or the activities of exemplary program 500 can be combined or skipped. In many embodiments, system 300 (FIG. 3) and/or system 311 (FIG. 3) can be suitable to perform exemplary program 500 and/or one or more of the activities of exemplary program 500.

Turning ahead in the drawings, FIG. 6 illustrates an application 600 by executing exemplary program 500 (FIG. 5) of optimizing deliver routes by clustering, according to the embodiment of FIG. 5. Application 600 in FIG. 6 is merely exemplary, and the method is not limited to the embodiments presented herein. In many embodiments, system 300 (FIG. 3) and/or system 311 (FIG. 3) can be suitable to perform the method of optimizing deliver routes by clustering for application 600. In a different embodiment, FIG. 6 illustrates application 600 by executing method 400 (FIG. 4).

Referring to FIG. 6, application 600 includes 2 state blocks 610 and 620. Block 610 shows the initial state when the delivery route comprises many back-and-forth segments, which is undesirable. Block 620 shows an updated state after executing exemplary program 500 (FIG. 5) or method 400 (FIG. 4), in various embodiments, on the initial state of the delivery route in block 610.

Figure 7:
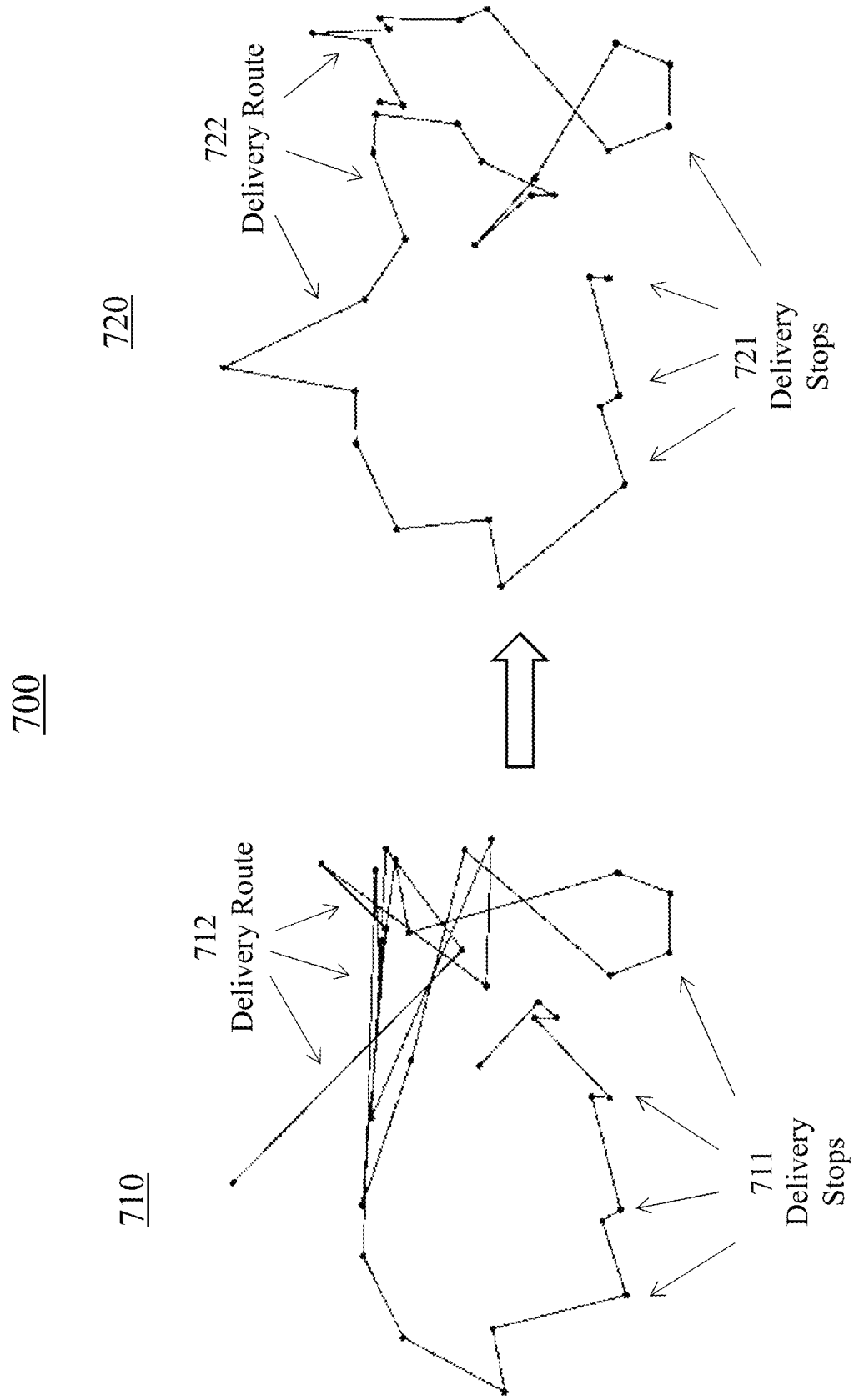
FIG. 7 illustrates another exemplary application for a method of optimizing a deliver route, according to the embodiment of FIG. 5.

Turning ahead in the drawings, FIG. 7 illustrates another application 700 by executing exemplary program 500 (FIG. 5) of optimizing deliver routes by clustering, according to the embodiment of FIG. 5. Application 700 in FIG. 7 is merely exemplary, and the method is not limited to the embodiments presented herein. In many embodiments, system 300 (FIG. 3) and/or system 311 (FIG. 3) can be suitable to perform the method of optimizing deliver routes by clustering for application 700. In a different embodiment, FIG. 7 illustrates application 700 by executing method 400 (FIG. 4).

Referring to FIG. 7, application 700 includes 2 state blocks 710 and 720. Block 710 shows the initial state when the delivery route comprises many back-and-forth segments, which is undesirable. Block 720 shows an updated state after executing exemplary program 500 (FIG. 5) or method 400 (FIG. 4), in various embodiments, on the initial state of the delivery route in block 710.

In many embodiments, the techniques described herein can provide a practical application and several technological improvements. In some embodiments, the techniques described herein can provide for automatically delivery route planning in real-time. These techniques described herein can provide a significant improvement in at least efficiency over conventional approaches of switching one pair of delivery stops at a time which can take more iterations to generate an acceptable delivery route.

In many embodiments, the techniques described herein can be used continuously at a scale that cannot be handled using manual techniques. For example, the number of delivery stops for orders to be delivered by a delivery vehicle can be over hundreds, and the time before the delivery route or any update thereof is needed for the delivery driver can be short, e.g., 3, 5, 10, or 30 seconds, etc.

In a number of embodiments, the techniques described herein can solve a technical problem that arises only within the realm of computer networks, as online ordering do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one more processors and perform certain acts. The acts can include extracting an initial delivery route from the delivery data. The initial delivery route can comprises delivery stops. The acts also can include setting a preferred delivery route as the initial delivery route.

Additionally, the acts can include evaluating, in real-time, the preferred delivery route by: (a) determining a to-be-resequenced delivery stop list based on the preferred delivery route; (b) determining, in real-time, whether the resequenced delivery route is preferred over the preferred delivery route; (c) when the resequenced delivery route is determined to be preferred over the preferred delivery route, resetting, in real-time, the preferred delivery route to be the resequenced delivery route; and (d) when the resequenced delivery route is determined to not be preferred over the delivery route, maintaining, in real-time, the preferred delivery route.

The to-be-resequenced delivery stop list can include a random quantity of delivery stops. Each delivery stop of the random quantity of delivery stops of the to-be-resequenced delivery stop list can be moved from the preferred delivery route to the to-be-resequenced delivery stop list to create a modified preferred delivery route containing remaining delivery stops from the preferred delivery route that are not in the random quantity of delivery stops. Further, the each delivery stop of the preferred delivery route can be selected to be moved to the to-be-resequenced delivery stop list by using a selecting act of multiple delivery-stop-selecting acts, and the selecting act can be determined based, at least in part, on a random number. Moreover, at any point in time during the evaluating the preferred delivery route, the delivery stops of the preferred delivery route comprise the remaining delivery stops of the modified preferred delivery route and the delivery stops of the random quantity of delivery stops of the to-be-resequenced delivery stop list.

The acts further can include, after determining the to-be-resequenced delivery stop list, creating, in real-time, a resequenced delivery route by adding each delivery stop of the random quantity of delivery stops of the to-be-resequenced delivery stop list to the modified preferred delivery route to create the resequenced delivery route. All of the delivery stops of the preferred delivery route can be in the resequenced delivery route. A sequence of the delivery stops of the preferred delivery route can be different from a sequence of the delivery stops of the resequenced delivery route.

The acts also can include repeating evaluating, in real-time, the preferred delivery route until a predetermined stop condition occurs. The acts further can include, after repeating evaluating, in real-time, the preferred delivery route, transmitting, in real-time via a network, the preferred delivery route to a driver mobile device (e.g., user device 321 (FIG. 1)) of a delivery driver for the delivery driver to follow the preferred delivery route (e.g., delivery route 340 (FIG. 3)) to make deliveries.

A number of embodiments can include a method being implemented via execution of computing instructions configured to run at one or more processors and stored at one or more non-transitory computer-readable media. The method can include extracting an initial delivery route from the delivery data. The initial delivery route can comprises delivery stops. The method also can include setting a preferred delivery route as the initial delivery route.

The method also can include evaluating, in real-time, the preferred delivery route by: (a) determining a to-be-resequenced delivery stop list based on the preferred delivery route; (b) determining, in real-time, whether the resequenced delivery route is preferred over the preferred delivery route; (c) when the resequenced delivery route is determined to be preferred over the preferred delivery route, resetting, in real-time, the preferred delivery route to be the resequenced delivery route; and (d) when the resequenced delivery route is determined to not be preferred over the delivery route, maintaining, in real-time, the preferred delivery route.

The to-be-resequenced delivery stop list can include a random quantity of delivery stops. Each delivery stop of the random quantity of delivery stops of the to-be-resequenced delivery stop list can be moved from the preferred delivery route to the to-be-resequenced delivery stop list to create a modified preferred delivery route containing remaining delivery stops from the preferred delivery route that are not in the random quantity of delivery stops. Further, the each delivery stop of the preferred delivery route can be selected to be moved to the to-be-resequenced delivery stop list by using a selecting act of multiple delivery-stop-selecting acts, and the selecting act can be determined based, at least in part, on a random number. Moreover, at any point in time during the evaluating the preferred delivery route, the delivery stops of the preferred delivery route comprise the remaining delivery stops of the modified preferred delivery route and the delivery stops of the random quantity of delivery stops of the to-be-resequenced delivery stop list.

The method further can include, after determining the to-be-resequenced delivery stop list, creating, in real-time, a resequenced delivery route by adding each delivery stop of the random quantity of delivery stops of the to-be-resequenced delivery stop list to the modified preferred delivery route to create the resequenced delivery route. All of the delivery stops of the preferred delivery route can be in the resequenced delivery route. A sequence of the delivery stops of the preferred delivery route can be different from a sequence of the delivery stops of the resequenced delivery route.

The method also can include repeating evaluating, in real-time, the preferred delivery route until a predetermined stop condition occurs. The method further can include, after repeating evaluating, in real-time, the preferred delivery route, transmitting, in real-time via a network, the preferred delivery route to a driver mobile device (e.g., user device 321 (FIG. 1)) of a delivery driver for the delivery driver to follow the preferred delivery route (e.g., delivery route 340 (FIG. 3)) to make deliveries.

Various embodiments can include a system including one or more processors and one or more non-transitory computer-readable media storing computing instructions configured to, when run on the one or more processors, cause the one or more processors to perform certain acts. The acts can include setting a preferred delivery route as an initial delivery route comprising original delivery stops. The acts further can include evaluating, in real-time, the preferred delivery route, comprising: (a) determining a to-be-resequenced delivery stop list by moving a random quantity of delivery stops from the original delivery stops to the to-be-resequenced delivery stop list based on a delivery-stop-selecting act, wherein: after the to-be-resequenced delivery stop list is determined, a modified preferred delivery route comprises remaining delivery stops from the original delivery stops; (b) after determining the to-be-resequenced delivery stop list, creating, in real-time, a resequenced delivery route by adding each delivery stop of the random quantity of delivery stops of the to-be-resequenced delivery stop list to the modified preferred delivery route; (c) determining, in real-time, whether the resequenced delivery route is preferred over the preferred delivery route; and (d) when the resequenced delivery route is determined to be preferred over the preferred delivery route, resetting, in real-time, the preferred delivery route to be the resequenced delivery route. The acts additionally can include transmitting, in real-time via a computer network, the preferred delivery route to a driver mobile device of a delivery driver for the delivery driver to follow the preferred delivery route to make deliveries.

A number of embodiments can include a method being implemented via execution of computing instructions configured to run at one or more processors and stored at one or more non-transitory computer-readable media. The method can include setting a preferred delivery route as an initial delivery route comprising original delivery stops. The method also can include evaluating, in real-time, the preferred delivery route, comprising: (a) determining a to-be-resequenced delivery stop list by moving a random quantity of delivery stops from the original delivery stops to the to-be-resequenced delivery stop list based on a delivery-stop-selecting act, wherein: after the to-be-resequenced delivery stop list is determined, a modified preferred delivery route comprises remaining delivery stops from the original delivery stops; (b) after determining the to-be-resequenced delivery stop list, creating, in real-time, a resequenced delivery route by adding each delivery stop of the random quantity of delivery stops of the to-be-resequenced delivery stop list to the modified preferred delivery route; (c) determining, in real-time, whether the resequenced delivery route is preferred over the preferred delivery route; and (d) when the resequenced delivery route is determined to be preferred over the preferred delivery route, resetting, in real-time, the preferred delivery route to be the resequenced delivery route. The method further can include transmitting, in real-time via a computer network, the preferred delivery route to a driver mobile device of a delivery driver for the delivery driver to follow the preferred delivery route to make deliveries.

Although the methods described above are with reference to the illustrated flowcharts, it will be appreciated that many other ways of performing the methods associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although providing automatically optimizing delivery routes has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 4-7 may include different procedures, processes, and/or activities and be performed by many different modules, in many different orders. As another example, one or more of the procedures, processes, and/or activities of one of FIGS. 4-7 can be performed in another one of FIGS. 4-7.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to, when run on the one or more processors, cause the one or more processors to perform:
      setting a preferred delivery route as an initial delivery route comprising original delivery stops;
      evaluating, in real-time, the preferred delivery route, comprising:
         generating a random act-selecting number;
         determining a delivery-stop-selecting act from multiple delivery-stop-selecting acts based, at least in part, on the random act-selecting number, as generated;
         determining a to-be-resequenced delivery stop list by moving a random quantity of delivery stops from the original delivery stops to the to-be-resequenced delivery stop list based on the delivery-stop-selecting act, as determined, wherein:
            after the to-be-resequenced delivery stop list is determined, a modified preferred delivery route comprises remaining delivery stops from the original delivery stops;
         after determining the to-be-resequenced delivery stop list, creating, in real-time, a resequenced delivery route by adding each delivery stop of the random quantity of delivery stops of the to-be-resequenced delivery stop list to the modified preferred delivery route;
         determining, in real-time, whether the resequenced delivery route is preferred over the preferred delivery route; and
            when the resequenced delivery route is determined to be preferred over the preferred delivery route, resetting, in real-time, the preferred delivery route to be the resequenced delivery route; and
      transmitting, in real-time via a computer network, the preferred delivery route, as reset, to a driver mobile device of a delivery driver for the delivery driver to follow the preferred delivery route, as reset, to make deliveries.

2. The system in claim 1, wherein:
   the multiple delivery-stop-selecting acts for selecting delivery stops to be moved to the to-be-resequenced delivery stop list comprise two or more of:
      randomly picking a particular one of the delivery stops to be removed from the preferred delivery route;
      determining the particular one of the delivery stops to be removed from the preferred delivery route based on a cost for the particular one of the delivery stops; or
      choosing the particular one of the delivery stops to be removed from the preferred delivery route based, at least in part, on a position of a previously resequenced delivery stops in a prior version of the preferred delivery route.

3. The system in claim 1, wherein the computing instructions are further configured to, when run on the one or more processors, cause the one or more processors to perform:
generating a random number within a predefined range; and
each delivery stop of the random quantity of delivery stops of the to-be-resequenced delivery stop list is moved from the preferred delivery route to the to-be-resequenced delivery stop list to create the modified preferred delivery route based, at least in part, on:
when (a) the random number is greater than a random number threshold defined by a function of a quantity of the delivery stops; and (b) a prior version of the preferred delivery route exists, choosing a delivery stop from the preferred delivery route based on a position of a previously resequenced delivery stop in the prior version of the preferred delivery route;
when (a) (i) the random number is not greater than the random number threshold, or (ii) no prior version of the preferred delivery route exists; and (b) the random quantity of delivery stops is greater than a predefined delivery stop count threshold, randomly picking a delivery stop from the preferred delivery route; and
when (a) (i) the random number is not greater than the random number threshold, or (ii) no prior version of the preferred delivery route exists; and (b) the random quantity of delivery stops is not greater than the predefined delivery stop count threshold:
determining a respective cost saving for removing each delivery stop of the remaining delivery stops of the modified preferred delivery route;
determining a most-cost-saving delivery stop of the remaining delivery stops of the modified preferred delivery route based on the respective cost saving; and
selecting the most-cost-saving delivery stop from the modified preferred delivery route.

4. The system in claim 1, wherein creating, in real-time, the resequenced delivery route comprises:
after adding each delivery stop of the random quantity of delivery stops of the to-be-resequenced delivery stop list to the modified preferred delivery route to create the resequenced delivery route, sorting, in real-time, the remaining delivery stops of the modified preferred delivery route.

5. The system in claim 1, wherein creating, in real-time, the resequenced delivery route further comprises:
after adding each delivery stop of the random quantity of delivery stops of the to-be-resequenced delivery stop list to the modified preferred delivery route to create the resequenced delivery route, using a greedy algorithm on the resequenced delivery route.

6. The system in claim 1, wherein creating, in real-time, the resequenced delivery route further comprises:
when the random quantity is greater than a predetermined quantity threshold:
after adding each delivery stop of the random quantity of delivery stops from the to-be-resequenced delivery stop list to the modified preferred delivery route to create the resequenced delivery route, sorting, in real-time, the remaining delivery stops of the modified preferred delivery route; and when the random quantity is not greater than the predetermined quantity threshold:
determining a respective cost addition for adding each delivery stop of the random quantity of delivery stops from the to-be-resequenced delivery stop list to the modified preferred delivery route to create the resequenced delivery route;
determining a lowest-cost-addition delivery stop of the random quantity of delivery stops from the to-be-resequenced delivery stop list based on the respective cost addition;
moving the lowest-cost-addition delivery stop from the to-be-resequenced delivery stop list to the modified preferred delivery route to create the resequenced delivery route; and
after moving the lowest-cost-addition delivery stop from the to-be-resequenced delivery stop list, sorting, in real-time, the remaining delivery stops of the modified preferred delivery route.

7. The system in claim 6, wherein:
sorting the remaining delivery stops of the modified preferred delivery route comprises using a greedy algorithm on the modified preferred delivery route.

8. The system in claim 1, wherein the computing instructions are further configured to, when run on the one or more processors, cause the one or more processors to perform:
generating the random quantity within a range defined by a function of a total quantity of the original delivery stops of the preferred delivery route.

9. The system in claim 8, wherein:
the range is from 10% to 40% of the total quantity of the original delivery stops of the preferred delivery route.

10. The system in claim 1, wherein:
determining, in real-time, whether the resequenced delivery route is preferred over the preferred delivery route comprises at least one of:
when a route cost of the resequenced delivery route is less than a route cost of the preferred delivery route, determining that the resequenced delivery route is preferred over the preferred delivery route; or
when a random number generated in a predefined range is greater than a threshold defined by a function of a variable associated with a total quantity of the original delivery stops of the preferred delivery route, determining that the resequenced delivery route is preferred over the preferred delivery route.

11. The system in claim 1, wherein the computing instructions are further configured to, when run on the one or more processors, cause the one or more processors to perform:
repeating evaluating, in real-time, the preferred delivery route until a predetermined stop condition occurs, wherein the random quantity of delivery stops of the to-be-resequenced delivery stop list are re-determined for each iteration of the repeating evaluating the preferred delivery route.

12. A method being implemented via execution of computing instructions configured to run at one or more processors and stored at one or more non-transitory computer-readable media, the method comprising:
setting a preferred delivery route as an initial delivery route comprising original delivery stops;
evaluating, in real-time, the preferred delivery route, comprising:
generating a random act-selecting number;
determining a delivery-stop-selecting act from multiple delivery-stop-selecting acts based, at least in part, on the random act-selecting number, as generated;

determining a to-be-resequenced delivery stop list by moving a random quantity of delivery stops from the original delivery stops to the to-be-resequenced delivery stop list based on the delivery-stop-selecting act, as determined, wherein:
after the to-be-resequenced delivery stop list is determined, a modified preferred delivery route comprises remaining delivery stops from the original delivery stops;
after determining the to-be-resequenced delivery stop list, creating, in real-time, a resequenced delivery route by adding each delivery stop of the random quantity of delivery stops of the to-be-resequenced delivery stop list to the modified preferred delivery route;
determining, in real-time, whether the resequenced delivery route is preferred over the preferred delivery route; and
when the resequenced delivery route is determined to be preferred over the preferred delivery route, resetting, in real-time, the preferred delivery route to be the resequenced delivery route; and
transmitting, in real-time via a computer network, the preferred delivery route, as reset, to a driver mobile device of a delivery driver for the delivery driver to follow the preferred delivery route, as reset, to make deliveries.

13. The method in claim 12, wherein:
the multiple delivery-stop-selecting acts for selecting delivery stops to be moved to the to-be-resequenced delivery stop list comprise two or more of:
randomly picking a particular one of the delivery stops to be removed from the preferred delivery route;
determining the particular one of the delivery stops to be removed from the preferred delivery route based on a cost for the particular one of the delivery stops; or
choosing the particular one of the delivery stops to be removed from the preferred delivery route based, at least in part, on a position of a previously resequenced delivery stop in a prior version of the preferred delivery route.

14. The method in claim 12 further comprising:
generating a random number within a predefined range; and
each delivery stop of the random quantity of delivery stops of the to-be-resequenced delivery stop list is moved from the preferred delivery route to the to-be-resequenced delivery stop list to create the modified preferred delivery route based, at least in part, on:
when (a) the random number is greater than a random number threshold defined by a function of a quantity of the delivery stops; and (b) a prior version of the preferred delivery route exists, choosing a delivery stop from the preferred delivery route based on a position of a previously resequenced delivery stop in the prior version of the preferred delivery route;
when (a) (i) the random number is not greater than the random number threshold, or (ii) no prior version of the preferred delivery route exists; and (b) the random quantity of delivery stops is greater than a predefined delivery stop count threshold, randomly picking a delivery stop from the preferred delivery route; and
when (a) (i) the random number is not greater than the random number threshold, or (ii) no prior version of the preferred delivery route exists; and (b) the random quantity of delivery stops is not greater than the predefined delivery stop count threshold:
determining a respective cost saving for removing each delivery stop of the remaining delivery stops of the modified preferred delivery route;
determining a most-cost-saving delivery stop of the remaining delivery stops of the modified preferred delivery route based on the respective cost saving; and
selecting the most-cost-saving delivery stop from the modified preferred delivery route.

15. The method in claim 12, wherein creating, in real-time, the resequenced delivery route comprises:
after adding each delivery stop of the random quantity of delivery stops of the to-be-resequenced delivery stop list to the modified preferred delivery route to create the resequenced delivery route, sorting, in real-time, the remaining delivery stops of the modified preferred delivery route.

16. The method in claim 12, wherein creating, in real-time, the resequenced delivery route further comprises:
after adding each delivery stop of the random quantity of delivery stops of the to-be-resequenced delivery stop list to the modified preferred delivery route to create the resequenced delivery route, using a greedy algorithm on the resequenced delivery route.

17. The method in claim 12, wherein:
creating, in real-time, the resequenced delivery route further comprises:
when the random quantity is greater than a predetermined quantity threshold:
after adding each delivery stop of the random quantity of delivery stops from the to-be-resequenced delivery stop list to the modified preferred delivery route to create the resequenced delivery route, sorting, in real-time, the remaining delivery stops of the modified preferred delivery route; and
when the random quantity is not greater than the predetermined quantity threshold:
determining a respective cost addition for adding each delivery stop of the random quantity of delivery stops from the to-be-resequenced delivery stop list to the modified preferred delivery route to create the resequenced delivery route;
determining a lowest-cost-addition delivery stop of the random quantity of delivery stops from the to-be-resequenced delivery stop list based on the respective cost addition;
moving the lowest-cost-addition delivery stop from the to-be-resequenced delivery stop list to the modified preferred delivery route to create the resequenced delivery route; and
after moving the lowest-cost-addition delivery stop from the to-be-resequenced delivery stop list, sorting, in real-time, the remaining delivery stops of the modified preferred delivery route.

18. The method in claim 17, wherein:
sorting the remaining delivery stops of the modified preferred delivery route comprises using a greedy algorithm on the modified preferred delivery route.

19. The method in claim 12 further comprising:
generating the random quantity within a range defined by a function of a total quantity of the original delivery stops of the preferred delivery route.

20. The method in claim 19, wherein:
the range is from 10% to 40% of the total quantity of the original delivery stops of the preferred delivery route.

21. The method in claim 12, wherein:
determining, in real-time, whether the resequenced delivery route is preferred over the preferred delivery route comprises at least one of:
when a route cost of the resequenced delivery route is less than a route cost of the preferred delivery route, determining that the resequenced delivery route is preferred over the preferred delivery route; or
when a random number generated in a predefined range is greater than a threshold defined by a function of a variable associated with a total quantity of the original delivery stops of the preferred delivery route, determining that the resequenced delivery route is preferred over the preferred delivery route.

22. The method in claim 12, further comprising:
repeating evaluating, in real-time, the preferred delivery route until a predetermined stop condition occurs, wherein the random quantity of delivery stops of the to-be-resequenced delivery stop list are re-determined for each iteration of the repeating evaluating the preferred delivery route.

* * * * *